US010157418B1

(12) United States Patent
Swamy et al.

(10) Patent No.: US 10,157,418 B1
(45) Date of Patent: Dec. 18, 2018

(54) SYSTEMS AND COMPUTER-IMPLEMENTED PROCESSES FOR OCCUPATIONAL RISK ASSESSMENT

(71) Applicants: Krishnan Swamy, Vienna, VA (US); Nikhil Murgai, Providence, RI (US)

(72) Inventors: Krishnan Swamy, Vienna, VA (US); Nikhil Murgai, Providence, RI (US)

(73) Assignee: Capital One Financial Services, McLean, VA (US)

( * ) Notice: Subject to any disclaimer, the term of this patent is extended or adjusted under 35 U.S.C. 154(b) by 0 days.

(21) Appl. No.: 14/093,647

(22) Filed: Dec. 2, 2013

Related U.S. Application Data

(60) Provisional application No. 61/734,513, filed on Dec. 7, 2012.

(51) Int. Cl.
*G06Q 40/02* (2012.01)

(52) U.S. Cl.
CPC .................................. *G06Q 40/025* (2013.01)

(58) Field of Classification Search
CPC ................................ G06Q 40/00; G06F 17/60
IPC ........................................................ G06F 17/60
See application file for complete search history.

(56) References Cited

U.S. PATENT DOCUMENTS

| 7,778,084 | B2* | 8/2010 | Kim | G11C 11/5628 |
| | | | | 365/185.17 |
| 7,788,084 | B2* | 8/2010 | Brun | G06F 17/271 |
| | | | | 704/7 |
| 7,970,676 | B2* | 6/2011 | Feinstein | G06Q 20/10 |
| | | | | 705/35 |
| 8,145,549 | B2* | 3/2012 | Das | G06Q 20/10 |
| | | | | 705/35 |
| 8,255,268 | B2* | 8/2012 | Rane | G06Q 30/0202 |
| | | | | 705/7.33 |
| 8,290,797 | B2* | 10/2012 | Hargroder | G06Q 40/08 |
| | | | | 705/4 |
| 8,571,919 | B2* | 10/2013 | Rane | G06F 17/30598 |
| | | | | 705/7.33 |
| 2004/0107161 | A1* | 6/2004 | Tanaka | G06Q 40/08 |
| | | | | 705/38 |
| 2011/0078073 | A1* | 3/2011 | Annappindi | G06Q 40/02 |
| | | | | 705/38 |

OTHER PUBLICATIONS

A common Risk Classification for the Actuarial Profession Jan. 2011 P.O.J. Kelliher D Wilmot P.J.M. Klumpes 38 pages (Year: 2011).*

* cited by examiner

*Primary Examiner* — Bruce I Ebersman
(74) *Attorney, Agent, or Firm* — Finnegan, Henderson, Farabow, Garrett & Dunner, LLP

(57) ABSTRACT

Systems and methods are disclosed for determine creditworthiness based on the stability of the customer's occupation. Occupational risk scores may be used to group stable or unstable occupations and may be used in conjunction with other indicators of creditworthiness. Risk band scores may also be used to determine creditworthiness. Other aspects of the disclosed embodiments are described herein.

21 Claims, 10 Drawing Sheets

FIG. 4A

| Risk Band | Average Annual Income | Average Education | | Unemployment | |
|---|---|---|---|---|---|
| | | ≤ High School | ≥ Masters | 2009 unemployment | Peak-to-trough change |
| 1 – low risk | $90K+ | 3% | 65% | 3.8% | 1.9% |
| 2 | $63K-$89K | 12% | 22% | 5.5% | 3.0% |
| 3 | $35K-$62K | 39% | 4% | 8.8% | 4.5% |
| 4 – high | $0-$34K | 69% | 1% | 14.7% | 8.5% |

FIG. 4B

| Occupation Title | Income Score | Education Scores | | Unemployment Scores | | Occupational Risk Score |
|---|---|---|---|---|---|---|
| | | ≤ High School | ≥ Masters | 2009 unemployment | peak-to-trough change | |
| Doctor | 1 | 1 | 1 | 1 | 1 | 5 |
| Construction worker | 2 | 3 | 4 | 4 | 4 | 17 |
| Teacher | 3 | 1 | 3 | 2 | 1 | 10 |

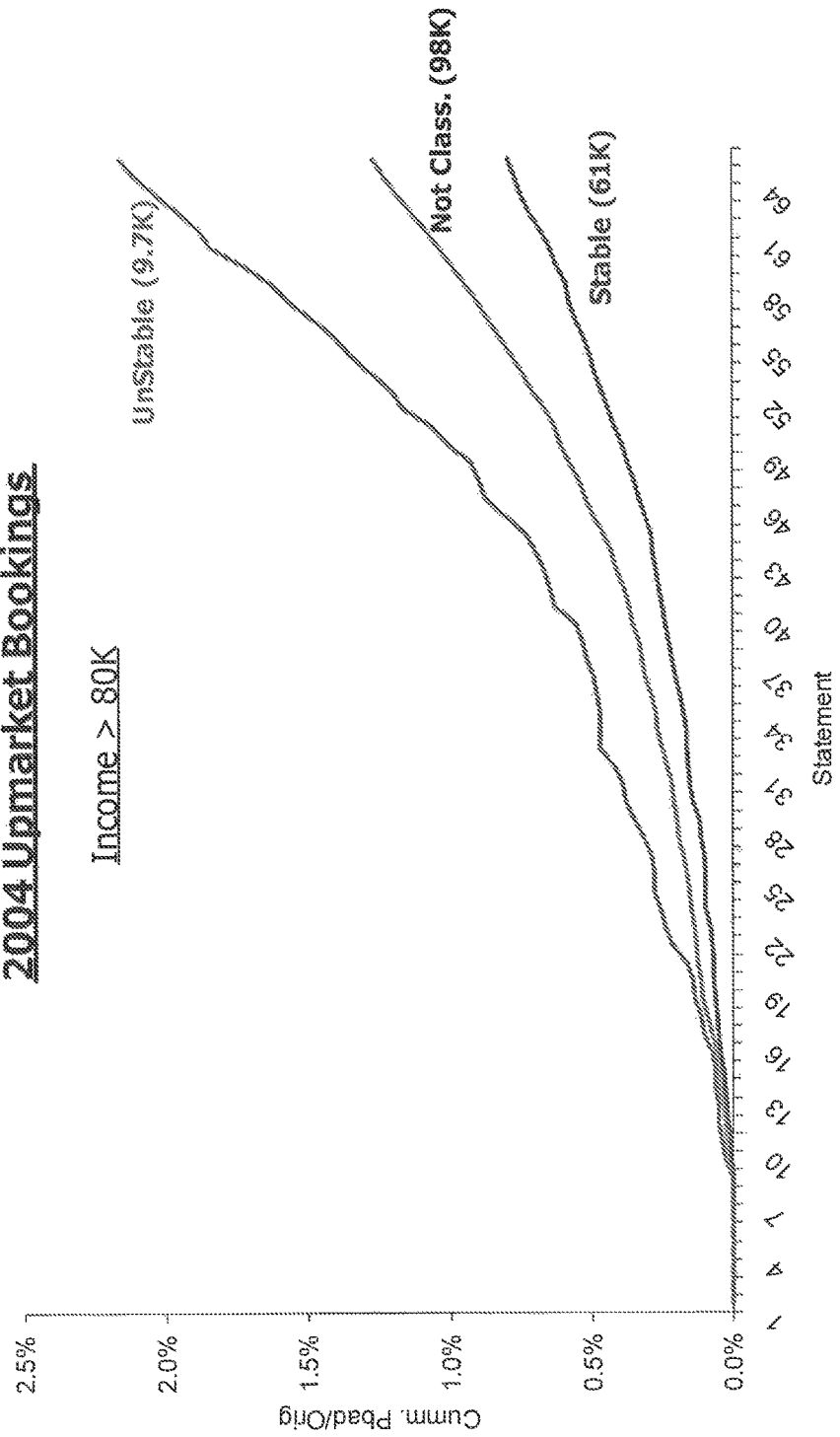

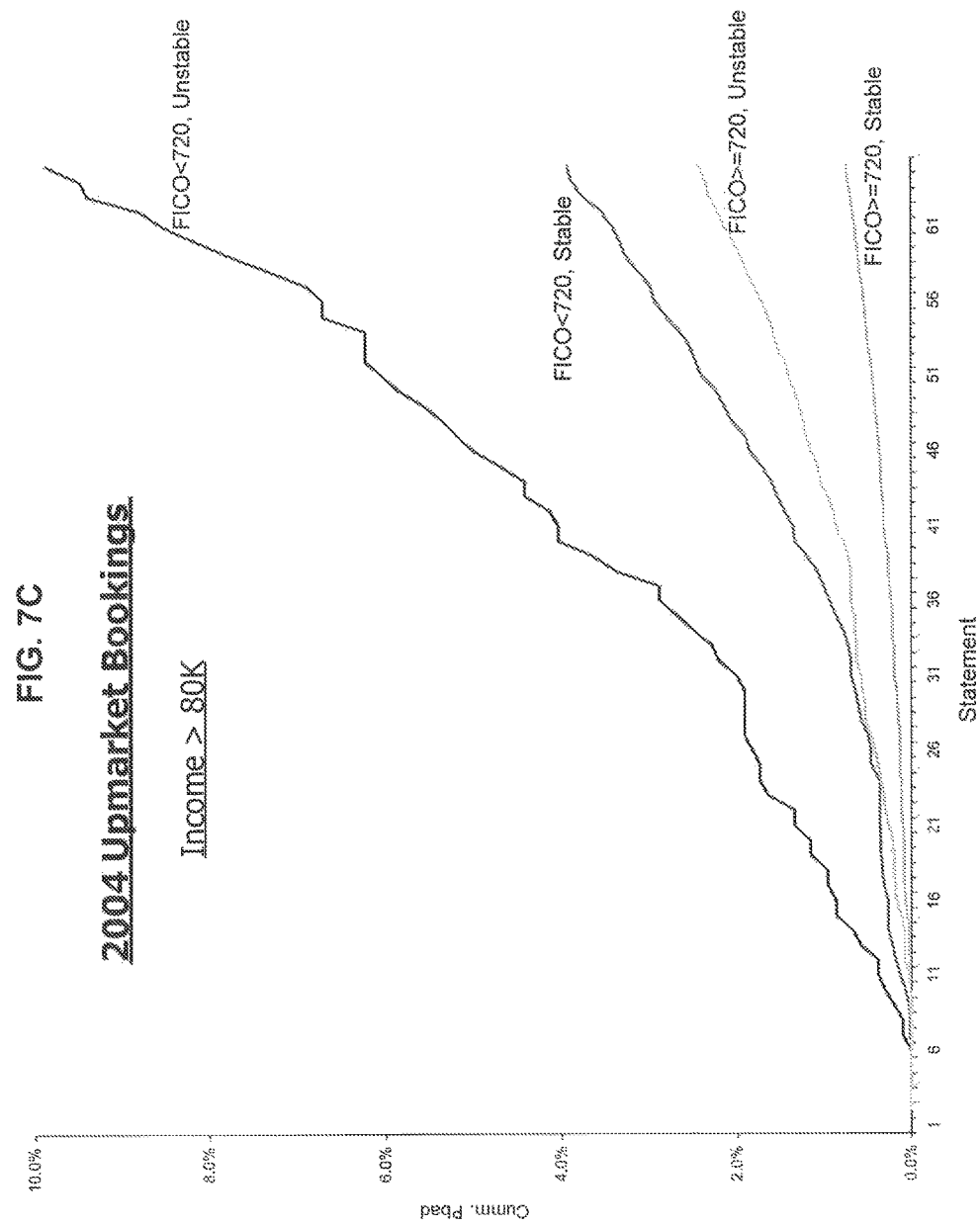

SYSTEMS AND COMPUTER-IMPLEMENTED PROCESSES FOR OCCUPATIONAL RISK ASSESSMENT

CROSS-REFERENCE TO RELATED APPLICATION

This application claims priority to U.S. Provisional Application No. 61/734,513, filed Dec. 7, 2012, the entire contents of which is hereby incorporated by reference.

FIELD

The disclosed embodiments generally relate to underwriting processes for financial accounts, and more particularly, to processes and systems for using occupational data to enhance risk analysis for determining credit lines and other aspects of financial accounts.

BACKGROUND

Currently, financial account providers, such as banks, credit card companies, merchants, lenders, and the like, analyze risk associated with a current or potential customer using such information as the customer's credit score, household income, assets, etc. These considerations may provide for an adequate assessment of the customer's present situation and ability to repay debt, but they provide limited insight as to the long-term ability of the customer to repay debt.

Creditworthiness is important to customers because it has an impact on their ability to open financial accounts, obtain or increase lines of credit, obtain certain interest rates, etc. A stable occupation is an asset to customers that could be treated as a positive indicator of creditworthiness; however, financial institutions do not currently use this information to determine creditworthiness.

In many credit applications, financial account providers request identification of the customer's current occupation. But beyond, perhaps, a rudimentary review that the customer is employed and that their reported annual income is consistent with their occupation, this information is largely unused by the financial account providers.

Thus, existing mechanisms fail to appreciate the asset a stable occupation represents to a consumer. Existing mechanisms are also limited in their ability to determine the long-term ability of a customer to repay debt. It is therefore desirable to provide a system and process that incorporates data on the stability of an occupation in determining the creditworthiness of a customer. Many benefits may be obtained by using occupational stability data in addition to traditional methods of determining credit worthiness. Such benefits may include, among others, savings from better prediction of credit risks and optimization of customer lines of credit. Using disclosed embodiments, financial account providers may also benefit from gains due to upmarket credit limit increases (e.g., increasing credit limits for upmarket customers) and graduation type programs (e.g., moving customers from main street type products to upmarket type products). The disclosed embodiments may be beneficial to many industries. For example, occupational stability data may be used to provide insurance providers a better understanding of a customer's ability to pay deductibles or premium installments for insurance products, which in turn would influence the premium calculations used by the insurance provider to determine the installment payment schedule.

SUMMARY

Disclosed embodiments include systems and processes for enabling a financial account provider to estimate the creditworthiness, and particularly the future creditworthiness, of a customer based on the occupation of the customer. It is to be understood that a customer may be a current customer of the financial provider or a potential customer of the financial service provider. The disclosed embodiments include, among other things, mechanisms for assisting in the gathering of information regarding the occupation of the customer and indicators of stability for various occupations, as well as mechanisms that assist in determining the stability of the occupation of a particular customer.

In certain embodiments, a computer-implemented method for determining creditworthiness of a customer is provided. The method may comprise receiving, by a processor, a list of indicators of stability for various occupations and designating risk bands for the various indicators of stability. Risk band scores may be assigned to occupations based on the indicators of stability associated with each occupation. The risk band scores may be used to generate an occupational risk score for each of the occupations. The method may further comprise receiving a customer's occupation information (or a set of occupation information from more than one customer). The customer occupation information may be matched to one of the occupations, and the occupational risk score for that occupation may be assigned to the customer occupation information. The assigned occupational risk score may be used to calculate the creditworthiness of the customer.

In certain embodiments, a financial account provider system for determining creditworthiness of a customer is provided. The system may include a storage device storing instructions and a processor configured to execute those instructions. The system may be configured to receive a list of indicators of stability for one or more occupations and designate risk bands for one or more of the indicators of stability. The system may be further configured to assign risk band scores to the occupations based on the indicators of stability associated with the occupations and generate occupational risk scores based on the risk band scores assigned to the occupations. The system may also be configured to receive a customer's occupation information (or a set of occupation information from more than one customer), match the customer occupation information with one of the occupations, and assign the occupational risk score for that occupation to the customer occupation information. The assigned occupational risk score may be used to calculate the creditworthiness of the customer.

Consistent with other disclosed embodiments, tangible computer-readable storage media may store program instructions executable by one or more processors to implement any of the processes disclosed herein.

It is to be understood that both the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 4A is an exemplary risk band matrix consistent with the disclosed embodiments.

FIG. 4B is an exemplary risk score chart consistent with the disclosed embodiments.

FIG. 6B is an example of the orthogonal risk splitting between unstable occupations and stable occupations for occupations with high incomes that can be obtained from occupational data to determine creditworthiness, consistent with the disclosed embodiments.

FIG. 7C is an exemplary graph depicting the stability of occupation with respect to FICO scores.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
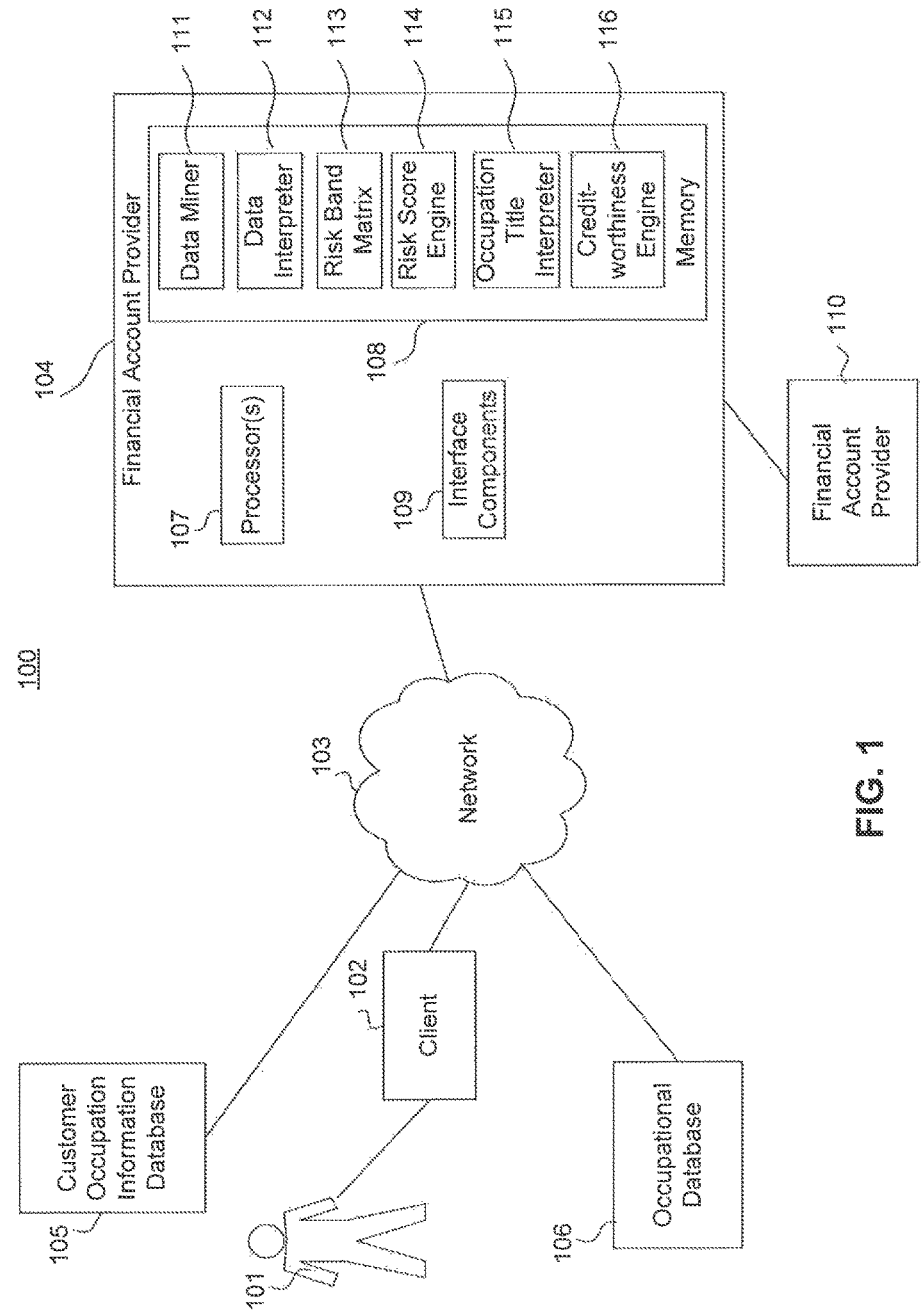
FIG. 1 is an exemplary system that may be used to implement the disclosed embodiments.

FIG. 1 is an exemplary system configured to perform one or more software processes that, when executed, provide one or more aspects of the disclosed embodiments. The components and arrangement shown in FIG. 1 are not intended to be limiting to any disclosed embodiment, as the components used to implement the processes and features disclosed here may vary.

In accordance with certain disclosed embodiments, system 100 may be provided that includes one or more clients 102 (associated with one or more customers 101), network 103, financial account provider system 104, customer occupation information database 105, and one or more occupational databases 106. Other components known to one of ordinary skill in the art may be included in system 100 to process, transmit, provide, and receive information consistent with the disclosed embodiments.

Financial account provider system 104 may be a computer-based system including computer system components, such as one or more servers, desktop computers, workstations, tablets, hand held computing devices, memory devices, and/or internal network(s) connecting the components. In one embodiment, financial account provider system 104 may be a server that includes one or more processors 107, memory devices, such as memory 108, and interface components 109. Financial account provider system 104 may be a single server or may be configured as a distributed computer system including multiple servers or computers that interoperate to perform one or more of the processes and functionalities associated with the disclosed embodiments. In certain embodiments, financial account provider system 104 may be a server associated with financial account provider 110, such as, for example, a bank, lender, merchant, credit card provider, an insurance provider, or any other entity that provides financial accounts to customers. Financial accounts may include, for example, credit card accounts, checking accounts, savings accounts, loans, investment accounts, insurance accounts, or any other type of account relating to financial products. In one aspect, financial account provider 110 may be a provider that advertises, solicits, or otherwise communicates with potential customers 101 to offer financial accounts or negotiate changes to existing financial accounts to customers 101 provided by financial account provider 110.

Processor(s) 107 may be one or more known processing devices, such as a microprocessor from the Pentium™ family manufactured by Intel™ or the Turion™ family manufactured by AMD™. Processor(s) 107 may include a single core or multiple core processor system that provides the ability to perform parallel processes simultaneously. For example, processor 107 may be a single core processor that is configured with virtual processing technologies known to those skilled in the art. In certain embodiments, processor 107 may use logical processors to simultaneously execute and control multiple processes. Processor 107 may implement virtual machine technologies, or other similar known technologies to provide the ability to execute, control, run, manipulate, store, etc. multiple software processes, applications, programs, etc. In another embodiment, processor(s) 107 may include a multiple-core processor arrangement (e.g., dual or quad core) that is configured to provide parallel processing functionalities to allow financial account provider system 104 to execute multiple processes simultaneously. One of ordinary skill in the art would understand that other types of processor arrangements could be implemented that provide for the capabilities disclosed herein.

Financial account provider system 104 may include one or more storage devices configured to store information used by processor 107 (or other components) to perform certain functions related to the disclosed embodiments. In one example, financial account provider system 104 may include a memory 108 that includes instructions to enable processor(s) 107 to execute one or more applications, such as server applications, network communication processes, and any other type of application or software known to be available on computer systems. Alternatively, the instructions, application programs, etc. may be stored in an external storage or available from memory over a network. The one or more storage devices may be a volatile or non-volatile, magnetic, semiconductor, tape, optical, removable, nonremovable, or other type of storage device or tangible computer-readable medium.

In one embodiment, financial account provider system 104 includes memory 108 that includes instructions that, when executed by processor(s) 107, perform one or more processes consistent with the functionalities disclosed herein. Methods, systems, and articles of manufacture consistent with disclosed embodiments are not limited to separate programs or computers configured to perform dedicated tasks. For example, financial account provider system 104 may include a memory that may include one or more programs to perform one or more functions of interface components 109. Moreover, processor(s) 107 may execute one or more programs located remotely from system 100. For example, system 100 may access one or more remote programs, that, when executed, perform functions related to disclosed embodiments. Memory 108 may include one or more memory devices that store data and instructions used to perform one or more features of the disclosed embodiments. Memory 108 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In certain embodiments, memory 108 may include software components that, when executed by processor(s) 107, perform one or more processes consistent with the disclosed embodiments. For example, memory 108 may include data miner 111, data interpreter 112, risk band matrix 113, risk score engine 114, occupation title interpreter 115, and creditworthiness engine 116, which include software instructions executable by one or more processors, such as processor(s) 107, alone or in various combinations.

In certain embodiments, data miner 111 may be configured to perform functions that find, copy, transmit, and store information on occupations and indicators of stability from external sources, such as occupational database 106, to financial account provider system 104. Data interpreter may be configured to clean and format occupational and indicators of stability data from various sources (such as occupational database 106) to remove errors in the data, consolidate data, and create more uniform data. Risk band matrix 113 may be configured to create and store the parameters for indicators of stability that define various risk bands (described further in FIGS. 2, 4A, and related text). Risk score engine 114 may be configured to calculate and store the risk scores associated with various occupations (described further in FIGS. 2, 4B, and related text). Risk score engine 114 may also be configured to categorize occupations by risk score and store the categorization information. Occupation title interpreter 115 may be configured to clean and format occupation titles from various sources (such as customer occupation information database 105 or client 102) to remove errors in the title data and compare the received occupational title to the list of occupations with indicators of stability information. Creditworthiness engine 116 may be configured to determine the creditworthiness of customer 101 (or customers associated with customer occupation information database 105) using the occupational risk band scores, occupational risk scores, or a combination of the occupational risk band scores, occupational risk scores and other creditworthiness scores for the customer 101.

Financial account provider system 104 may also be communicatively connected to one or more memory devices (e.g., customer occupation information database 105, occupational database 106, or other databases (not shown) locally or through a network). In certain embodiments, customer occupation information database 105 stores information about current customers or potential customers, including occupation title data that may be accessed by financial account provider system 104. Customer occupation information database 105 may be associated with financial account provider 110. For example, financial account provider 110 may be interested in increasing lines of credit for certain of its current customers which are low credit risks based on occupation information collected about its current customers. The remote memory devices may be configured to store information and may be accessed and/or managed by financial account provider system 104. By way of example, the remote memory devices may employ a document management system. Systems and methods of disclosed embodiments, however, are not limited to separate databases or even to the use of a database.

Financial account provider system 104 may also include one or more I/O devices that may comprise one or more interfaces for receiving signals, or input from input devices, and providing signals or output to one or more output devices that allow data to be received and/or transmitted by financial account provider system 104. For example, financial account provider system 104 may include interface components 109 that may provide interfaces to one or more input devices. Input devices may include, for example, one or more keyboards, mouse devices, and the like, that enable financial account provider system 104 to receive data from one or more users, such as customers 101 using clients 102 or representatives of financial account provider 110. Further, interface components 109 may include components configured to send and receive information between components of financial account provider system 104, customer occupation information database 105, clients 102, and occupational database 106. Interface components 109 may interface with other components or devices through network 103.

Network 103 may be any type of network that provides communications, exchanges information, and/or facilitates the exchange of information between Financial account provider system 104 and client 102. In one embodiment, network 103 may be the Internet, a Local Area Network, or other suitable connection(s) that enables system 100 to send and receive information between the components of system 100.

Client 102 may each be one or more computer systems associated with or used by one or more customers 101. For example, client 102 may include a general purpose or notebook computer, a mobile device with computing ability, a server, a desktop computer, tablet, or any combination of these computers and/or affiliated components. In one embodiment, each client may be a computer system or device that is operated by customer 101 who may be a current customer or a potential customer of financial service provider 110. Client 102 may be configured with storage that stores one or more operating systems that perform known operating system functions when executed by one or more processors. By way of example, the operating systems may include Microsoft Windows™, Unix™, Linux™, or Apple™ type operating systems. The operating systems may also include Personal Digital Assistant (PDA) type operating systems, such as Microsoft CE™, Apple iOS, or other types of operating systems. Embodiments of the disclosed invention will operate and function with computer systems running any type of operating system. Client 102 may also include communication software that, when executed by a processor, provides communications with network 103, such as Web browser software, tablet or smart hand held device networking software, etc. Accordingly, client 102 may be a device that executes mobile applications, such as a tablet or mobile device.

Figure 2:
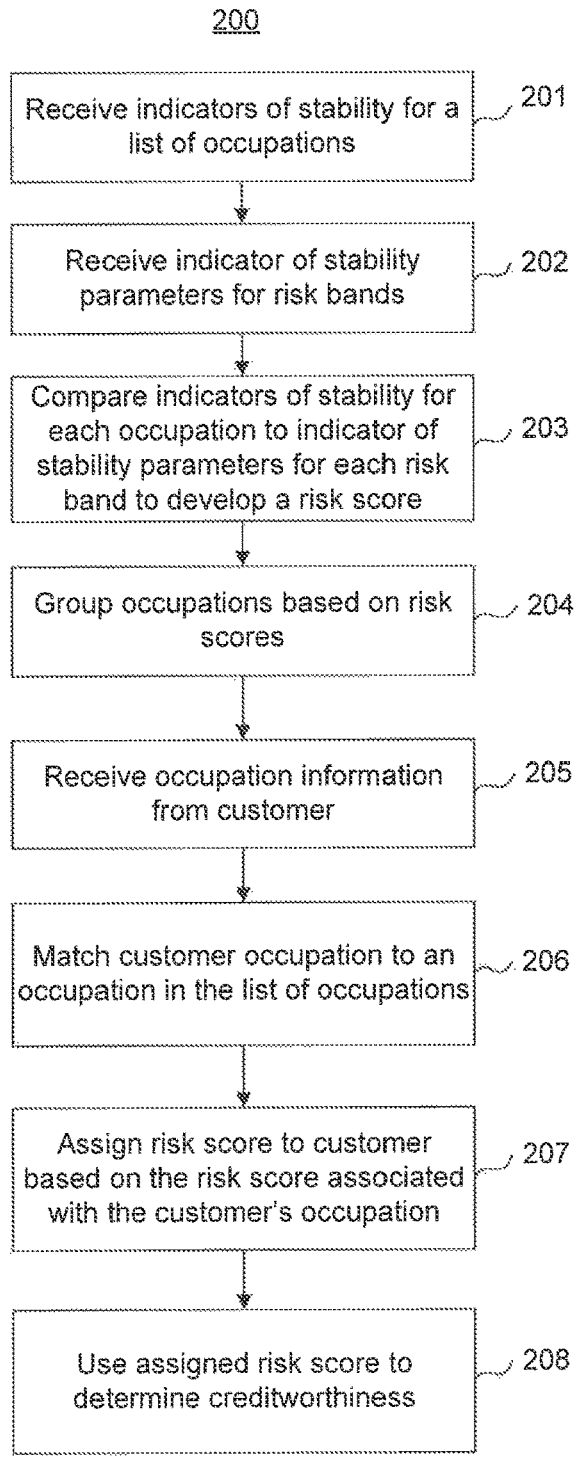
FIG. 2 is a flowchart of an exemplary occupation risk assessment process consistent with the disclosed embodiments.

FIG. 2 depicts a flowchart providing an exemplary overview of the occupation risk assessment process. As shown in process 200, indicators of stability for a list of occupations may be received (step 201). The indicators may be stored in memory 108 operated by financial account provider 110. Indicators of stability may include, for example, average annual income for an occupation, average highest educational level attained for the occupation, percentage of persons with various educational histories for the occupation, average unemployment rate for that occupation, change in unemployment rate over a period of time (e.g., during an economic downturn, for example), etc. FIG. 4A provides an exemplary risk band matrix for various indicators of stability 401-407. Additional advantageous indicators of stability for occupations may also be considered. For example, geographic location may affect the stability of an occupation (e.g., construction workers in the Washington, D.C. area may have more a more stable occupation than construction workers in the Las Vegas, Nev. area). The list of occupations and associated indicators of stability may be created by the entity that operates process 200 (e.g., financial account provider 110). Alternatively, lists of occupations and associated indicators of stability may be obtained, via network 103, from various public and private occupational databases 106 (see also, data miner 111 and related text below). For example, the Bureau of Labor and Statistics maintains databases containing indicators of stability and occupational information suitable for use in process 200. The lists and indicators may need to be interpreted (i.e., cleaned and properly formatted) so that they are suitable for use in process 200 (see, e.g., FIG. 3, data interpreter 112 of FIG. 1, and related text).

Parameters may be also received and stored in memory 108 (step 202). The parameters may be associated with, for example, risk band matrix 113. The parameters may define risk bands for each indicator of stability. Alternatively or additionally, the parameters may define risk bands associated with sub-combinations of the indicators. The number of risk bands and the parameters associated with each risk band may be determined by the financial account provider operating process 200. Alternatively or additionally, parameters that coincide with analyses conducted by other entities may be adopted so that the data provided by process 200 becomes more easily compared to other data. Other risk band divisions advantageous to disclosed embodiments are possible. The creation of an exemplary risk band matrix is described in more detail in relation to FIG. 4A, below.

Values of each of the indicators of stability for a particular occupation may be compared to the indicator of stability parameters and assigned risk band scores for each indicator (step 203). The risk band scores may be compiled to create an occupational risk score for that occupation. The compilation of the risk band scores may be weighted such that certain indicators of stability have a greater effect on the risk score than other indicator of stability (i.e., the average education attained risk band score may be weighted to have a greater effect on the occupational risk score than the unemployment rate for that occupation for a certain year or years). The calculation of exemplary occupational risk scores for certain occupations is described in more detail in relation to FIG. 4B, below. Alternatively, in some embodiments, the occupations are merely associated with one or more risk band scores, without further compilation of the risk band scores to develop the occupational risk score.

In shown in step 203, the financial account provider system 104 may also be configured to receive occupation information from a customer or a potential customer (e.g., from customer 101 via client 102) or about a customer or potential customer (e.g., from customer occupation information database 105). The occupations may be grouped according to occupational risk scores. For example, the occupational risk scores may be divided into quartiles, with the highest 25% of occupational risk scores associated with the least stable occupations and the highest credit risk customers and the lowest 25% of occupational risk scores associated with the most stable occupations and the lowest credit risk customers. Alternatively, in some embodiments, the occupations are merely associated with risk scores, without further grouping of occupations according to risk scores.

Financial account provider system 104 may be configured to receive occupation information from customer 101 (step 205). The formatting of the customer's occupation information is described in more detail in relation to FIG. 5 below (see also FIG. 1 at occupation title interpreter 115 and related text). Financial account provider system 104 may also be configured to match the customer's occupation to an occupation in the list of occupations (step 206). Based on the match, the risk score associated with the stability of the customer's occupation may be assigned to customer 101. According to the groupings of occupations, the classification of the stability of the customer's occupation may be assigned (step 207). Alternatively, based on the match, the occupational risk score without a classification of the occupation based on the score may be assigned to customer 101. As a further alternative, based on the match, the risk band scores may be assigned to customer 101 without assigning an occupational risk score or a classification of the occupation according to the occupational risk score.

In certain embodiments, the assigned occupational risk score (or risk band scores or classification of occupation based on occupational risk score) may be used to determine creditworthiness (step 208). In determining creditworthiness, scores or classifications associated with more stable occupations may be associated with lower credit risk and better creditworthiness. Similarly, scores or classifications associated with less stable occupations may be associated with higher credit risk and less creditworthiness. Alternatively, at step 208, the assigned scores or classifications may be used in conjunction with other indicators of creditworthiness to determine the creditworthiness of customer 101. Further details regarding the use of the scores or classifications to determine creditworthiness and use with other indicators of creditworthiness are detailed in relation to FIGS. 6A-7C.

Figure 3:
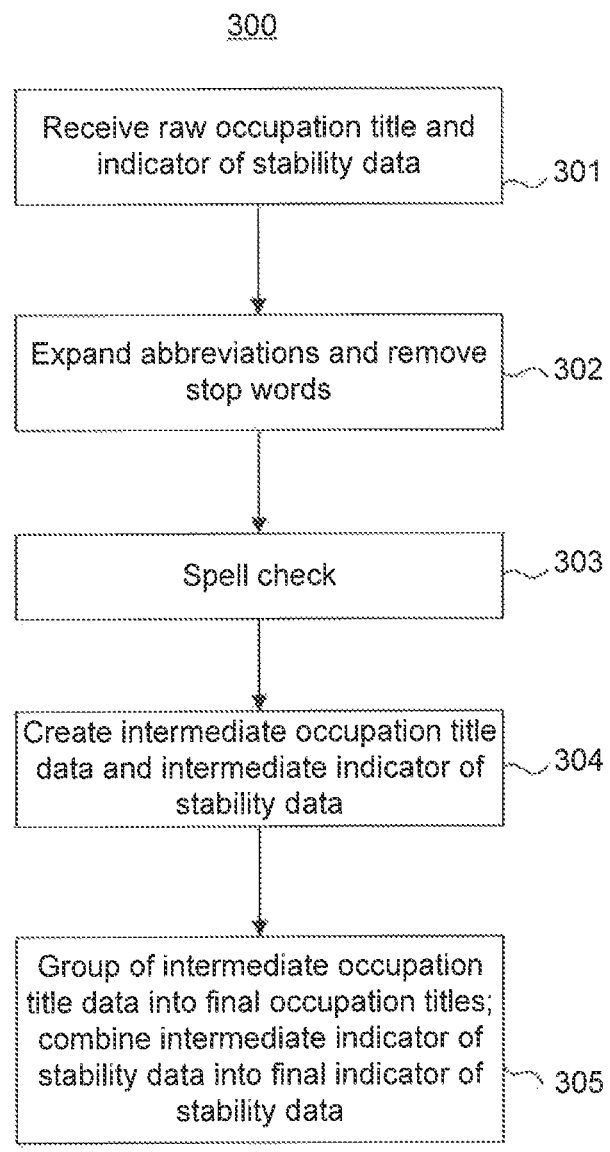
FIG. 3 is a flowchart of an exemplary data interpreting process consistent with the disclosed embodiments.

FIG. 3 depicts a flowchart of an exemplary data interpreting process which may be used in process 200, including step 201 of FIG. 2. Financial account provider 110 may desire to use data interpreting process 300 to clean, format, and consolidate data received from various sources (or from a single source) so that the data is easier to manipulate. Occupational title data and indicators of stability data may be obtained from free-form (unstructured) text that may have typographical errors, abbreviations, employer names (instead of occupations), synonyms (that may allow consolidation into a single occupation title for the purposes of disclosed embodiments), near homonyms, or other errors that make consolidating the data difficult. Even data captured through dropdown menus or other static sets of occupational options may benefit from data interpretation so that data from various sources can more easily be combined. Data interpreter 112 of financial account provider system 104 may be configured to provide data interpreting process 300.

Data interpreter 112 may also receive raw occupation title data and indicator of stability data (step 301). This data may be received from data miner 111, which may have obtained the data from occupational database 106. Words in occupation titles may be expanded to remove abbreviations based on lists of abbreviations, expansions, and substitutions in order to substitute the complete word for the abbreviated word. In certain embodiments, a list of stop words (i.e., words that do not add special meaning such as "and," "the," etc.) and/or a list of special characters (e.g., #, $, %) may be used to remove stop words and special characters from the data. One or more dictionaries may also be used to check the spelling of occupations (step 303), replacing the misspellings with the correctly spelled occupation title.

The cleaning of the data may create a set of intermediate occupation title data and intermediate indicator of stability data allowing for the grouping of data (step 304). Using natural language processing, synonymous or closely related occupation titles may be consolidated into a single final occupation title. Using functions, which may be weighted, the intermediate indicator of stability data for the various intermediate occupation titles may be consolidated so that the final occupation title is associated with a single set of indicators of stability. For example, a "letter carrier" (intermediate occupation title) may be associated with an average annual salary of $35,000 (intermediate indicator of stability) and a "mailman" (intermediate occupation title) may be associated with an average annual salary of $37,000 (intermediate indicator of stability). The final occupation title may be "postal worker" and the final indicator of stability associated with a postal worker may be an average salary of $36,000 (see, e.g., step 305). Other functions besides straight averaging may be used to combine indicators of stability into final indicators of stability. For example, weighted average functions may be used. For instance, if the average annual salary for five individual "letter carriers" was $35,000, and the average annual salary for 15,000 individual "letter carriers" was $37,000, the combination of these may be weighted so that the final indicator of stability for "postal workers" was $36,999 ((5 individuals×$35,000+15,000 individuals×$37,000)/20,000 total individuals=$36,999 per individual).

In certain embodiments, in addition to consolidating similar occupation titles into final occupation titles, a separate final occupation title of sensitive occupation may be created. The sensitive occupation title may include occupation titles for which policies or laws may exist, and for which financial account provider 110 may decide to treat differently than other occupations (for example, weighting the indicators of stability differently, etc.). For example, due to anti-discrimination policies, data interpreter 112 may be configured to consolidate such occupation titles as retired, homemaker, housewife, and disabled into a sensitive occupation title. Of course, other such consolidations based on other criteria are contemplated in the disclosed embodiments, and one of skill in the art would understand consolidations that would be advantageous.

FIG. 4A depicts an exemplary risk band matrix, which may be used in process 200. Financial account provider system 104 may be configured to create and/or store risk band matrix 113. Risk band matrix 113 may be created using occupations and indicator of stability data from occupational database 106, which may have been obtained using data miner 111 and cleaned and formatted by data interpreter 112.

As shown in FIG. 4A, risk bands 408 may be created, providing the parameters for the indicators of stability. In certain embodiments, the range of indicators of stability for all occupations may be divided into quartiles to create four risk bands. Risk bands for one or more income parameters (i.e., average annual income 401) may be provided. In the exemplary matrix shown in 4A, average annual income across all occupations range from $0 to over $90,000. Risk band 1, associated with the highest occupational stability and the lowest credit risk, may represent the first quartile of all of the occupational income data (i.e., the top 25% of all of the occupations, which have an annual average income of over $90,000, rounded to the nearest $1,000). Risk band 2, associated with slightly lower stability and a slightly higher risk than risk band 1, may represent the second quartile of all of the occupational income data (i.e., the second 25% of all occupations, which have an annual average income of $63,000 to $89,000, rounded to the nearest $1,000). Similarly, risk band 3 of FIG. 4A may be associated with the third quartile (i.e., the third 25% of all occupations, which have an average annual income of $35,000 to $62,000). And risk band 4 of FIG. 4A may be associated with the fourth quartile, the lowest occupational stability and the highest credit risk (i.e., the bottom 25% of all occupations, which have an average annual income of $0-$34,000).

Risk bands for one or more education parameters (e.g., average education 402) may also be provided, as shown in FIG. 4A. Risk band 1 for average education may be associated with less than 3% of individuals with a certain occupation obtaining less than a high school diploma. Risk band 1 may also be associated with greater than 65% of individuals with certain occupation obtaining a masters degree or higher. Risk bands 2-4 follow similarly. These two exemplary parameters are mutually exclusive, and risk band scores can be assigned for each. For example, if an occupation requires a bachelors degree, but very few individuals obtain anything beyond the bachelors, then that occupation could be associated with a 1 risk band score in average education (for less than 3% obtaining less than a high school diploma) and a 5 risk band score in average education (for less than 1% obtaining more than a masters degree).

Risk bands for one or more unemployment parameters (i.e. unemployment 405) may be provided. As shown, the unemployment rate for the lowest risk, most stable occupations in 2009 (i.e., the top quartile) was 3.8% or lower. The highest risk, most unstable occupations in 2009 (i.e., the bottom quartile) was 14.7% or higher. FIG. 4A also provides historical data for the change in unemployment rates during an economic downturn. For risk band 1, the most stable occupations, the unemployment rates only fluctuated 1.9% or less from its lowest to highest unemployment rates during a difficult economic period. For risk band 4, the most unstable occupations, the unemployment rates fluctuated 8.5% or more from the lowest to highest unemployment rates during the same period. Again, these two unemployment parameters (2009 unemployment 406 and peak-to-trough change 407) are mutually exclusive. Risk scores may be assigned to one without affecting the other. For example, if an occupation is associated with high unemployment rates, but that unemployment rate is generally steady over time and did not get worse during the economic downturn, then that occupation could be assigned a risk band score of 4 in unemployment (for unemployment over 14.7% in 2009) and 1 in unemployment (for peak-to-trough changes in unemployment rates of less than 1.9%). Additional risk matrices may also be advantageous to the disclosed embodiments.

FIG. 4B is an exemplary risk score chart that may be used in process 200. The risk score engine may be configured to generate risk score chart. Generation of the risk score chart may include using occupation title and indicator of stability data from occupational database 106, obtained by data miner 111, cleaned and formatted by data interpreter 112, organized into a risk band matrix, and stored in risk band score matrix 113.

To generate a risk score chart, the individual indicators of stability 409 associated with a particular occupation 410 may be compared to the risk band matrix and assigned risk band scores 411. For example, as shown, a doctor (occupation) may earn more than $90,000 annually, on average, so an income risk band score of 1 may be assigned. Less than 3% of doctors may have less than a high school diploma and more than 65% of doctors may have a higher degree than a master's, so two educations scores of 1 may be assigned. Doctors may have very low unemployment and may continue to have low unemployment even in poor economic times, so two more scores of 1 are assigned for the unemployment scores. Similar comparisons may be done for other occupations (such as construction worker and teacher, as shown in chart 4B).

Occupational risk scores 412 may be generated by combining some or all of the risk band scores. As shown in FIG. 4B, risk band scores may be added together to generate occupational risk scores 412. Alternatively, certain risk band scores may be given more weight or may be excluded from the occupational risk score calculation.

Figure 5:
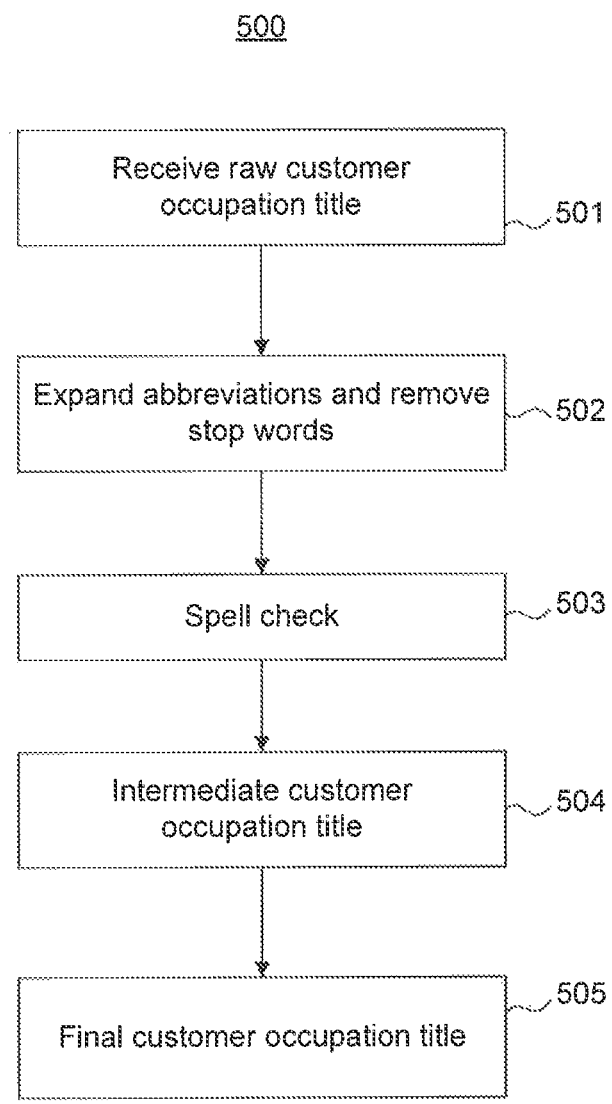
FIG. 5 is a flowchart of an exemplary occupation title interpreter consistent with the disclosed embodiments.

FIG. 5 is a flowchart of an exemplary occupation title interpreter process consistent with disclosed embodiments, including steps 105 and 106 of process 200. Financial account provider 110 may desire to use occupation title interpreter process 500 to clean, format, and consolidate title data received from various sources (such as customer 101 (via client 102) or customer occupational database 105) so that the data is easier to manipulate. As noted above in relation to FIG. 3, occupational title data (regardless of the source) may contain typographical errors, abbreviations, etc. It may also be beneficial even for data that is free from errors to be processed through process 500 so that the customer's occupation title is consolidated into one of the occupational titles for which indicators of stability are known (i.e., so that the natural language processing associates the customer's occupation title with one of occupations in the list of occupations).

Occupation title interpreter 115 of financial account provider system 104 may be configured to provide occupation title interpreting process 500. Occupation title interpreter 112 may receive a raw occupation title (step 501). Using a list of abbreviations, expansions, and substitutions, words in occupation titles may be expanded to remove abbreviations, substituting the complete word for the abbreviated word. In certain embodiments, a list of stop words (i.e., words that do not add special meaning, such as "and," "the," etc.) and list of special characters (e.g., #, $, %) may be used to remove stop words and special characters from the customer's occupation title. One or more dictionaries may also be used to check the spelling of the occupation, replacing the misspellings with the correctly spelled occupation title (step 503).

After the cleaning of the data, which may create an intermediate customer occupation title (step 504), natural language processing techniques and/or comparison functions may be used to match the customer's occupation title to one of the occupation titles in the list of occupations for which indicators of stability, risk band scores, occupational risk scores, or categories of stability are known. This matched occupation title may be the final customer occupation title 505.

Figure 6A:
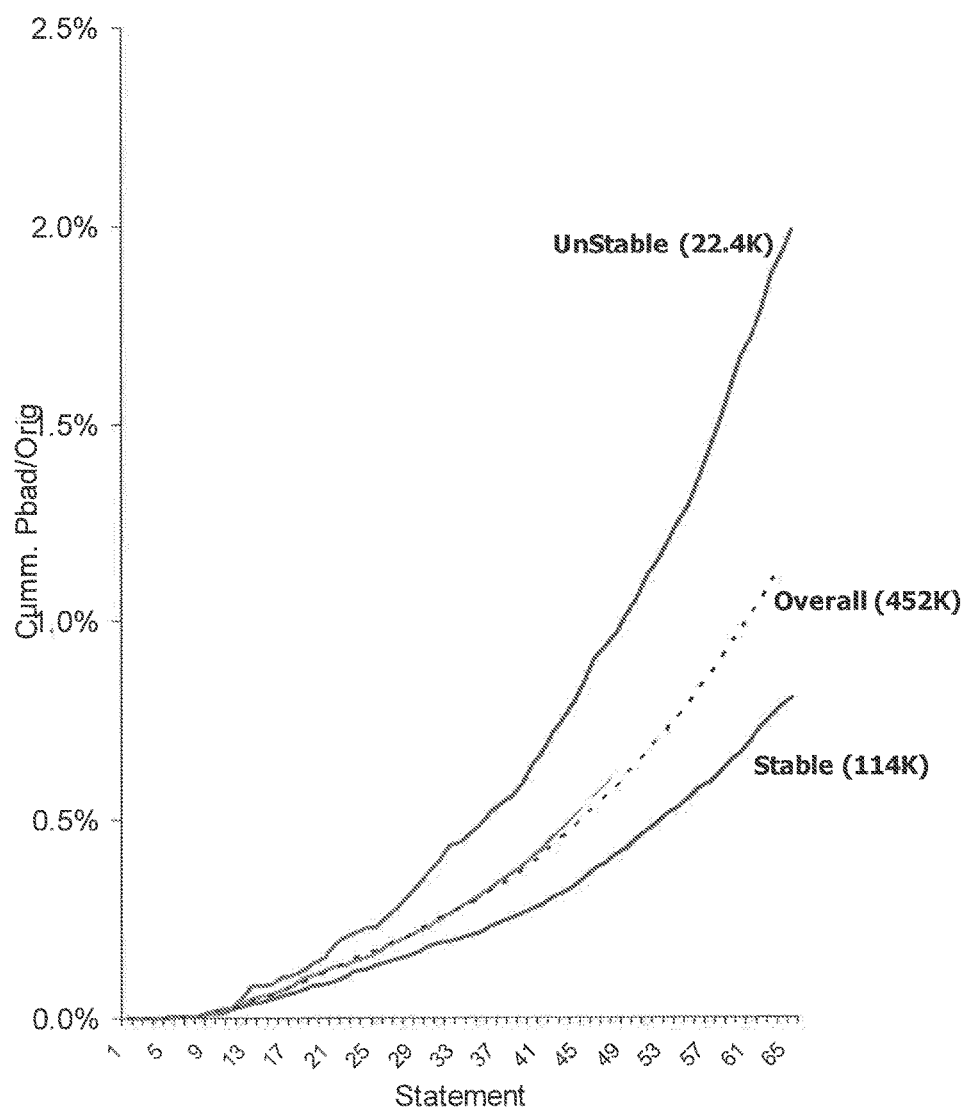
FIG. 6A is an example of orthogonal risk splitting between overall unstable occupations and overall stable occupations that can be obtained from occupational data to determine creditworthiness, consistent with the disclosed embodiments.

FIG. 6A is an example of orthogonal risk splitting between overall unstable occupations and overall stable occupations obtained by using occupational data to determine creditworthiness. Orthogonal risk splitting or risk splitting is a division or separation of data, often data with similar characteristics, based upon an additional criterion or additional criteria. For example, as shown in FIG. 6A, account data that may be similar based on standard characteristics may show orthogonal risk splitting when the additional criterion of occupational stability is applied. In the graph, historic data for 452,000 accounts from customers in deciles 1-3 were analyzed, consistent with disclosed embodiments. Deciles 1-3 are the 30% of accounts deemed to have the lowest risk based on standard risk metrics (before occupational risk metrics are applied). Using data from the Bureau of Labor and Statistics, various occupations were given occupation risk scores. The occupations of the customers associated with 452,000 accounts were associated with the various occupational risk scores, consistent with disclosed embodiments. The top quartile of accounts, associated with occupations with the lowest occupational risk scores, were deemed stable occupation accounts. The bottom quartile of accounts, associated with occupations with the highest occupational risk scores, were deemed unstable occupation accounts. Of the 452,000 accounts, 114,000 accounts were deemed stable occupation accounts and 22,400 were deemed unstable occupation accounts. The historic cumulative percentage of accounts that have charged off during a period of time (i.e., the total number of accounts over a period of time that have had at least one charge off during that period of time divided by the total number of accounts at the start of the study, or the percentage of bad accounts per original accounts, or the "cumulative Pbad/orig") over a 61-month period was graphed for (1) all of the 452,000 accounts—the dotted line labeled 'Overall (452K)"; (2) the 114,000 stable occupation accounts—the lower solid line labeled "Stable (114K)"; and (3) the 22,400 unstable occupation accounts—the higher solid line labeled "UnStable (22.4K)." As shown, even among customers provided lines of credit based on creditworthiness calculations known in the art, further insight into risk can be seen by applying the occupational risk classifications. Customers with occupations deemed unstable show less creditworthiness, as evidenced by the higher cumulative Pbad/orig rates as compared to both the stable occupation accounts and the accounts overall. And customers with occupations deemed stable show higher credit worthiness, as evidenced by the lower cumulative Pbad/orig rates as compared to both the unstable occupation accounts and the accounts overall.

FIG. 6B is an example of the orthogonal risk splitting between unstable occupations and stable occupations for occupations with high incomes (over $80K annually) that can be obtained by using occupational data to determine creditworthiness. In this figure, the each line depicts the cumulative Pbad/orig for accounts of customers with annual incomes of over $80,000. Even when normalizing the data by income (i.e., analyzing data from customers with similar incomes), orthogonal risk splitting may be observed. As shown in FIG. 6B, 9,700 accounts were associated with occupations that were deemed unstable, and those accounts had a higher rate of cumulative Pbad/orig than 98,000 unclassified (Not class) accounts, and over double the rate of the 61,000 accounts that associated with stable occupations.

Figure 7A:
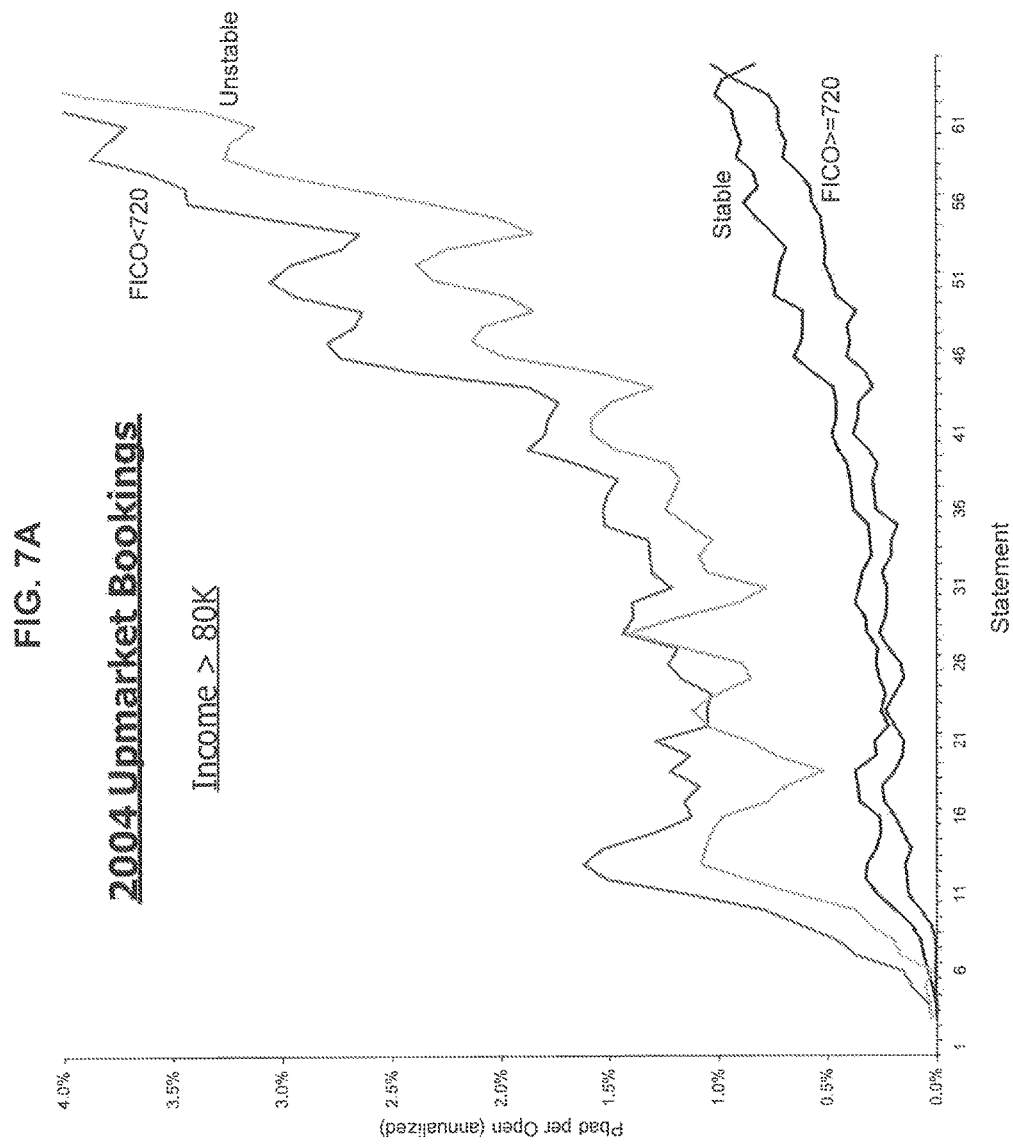
FIG. 7A is an exemplary graph of the percentage of open accounts that charge-off in any one month (i.e., percentage of 'bad' accounts for a month compared to number of open accounts that month or "Pbad per open") for accounts associated with FICO scores and occupation stability for customers with annual incomes of over $80,000.

FIG. 7A is an exemplary graph of the Pbad per open for accounts associated with FICO scores and occupation stability for customers with annual incomes of over $80,000. Consistent with disclosed embodiments, similar to as described in FIG. 6A, account data was analyzed based on occupation. The top quartile of accounts was deemed stable occupation accounts and the bottom was deemed unstable occupation accounts. Historical account data for the Pbad per open over 61 months was graphed for (1) all accounts associated with customers with a FICO score above 720; (2) all accounts associated with customers with a FICO score below 720; (3) the 25% of accounts deemed stable occupation accounts; and (4) the 25% of accounts deemed unstable occupation accounts. As shown, the Pbad per open rates for customers with stable occupations tend to align with the rates for customers with high FICO scores, and the rates for customers with unstable occupations tend to align with the rates for customers with low FICO scores. This indicates creditworthiness determinations based on occupational stability share similar predictive strengths to traditional determinations of creditworthiness such as FICO scores.

Figure 7B:
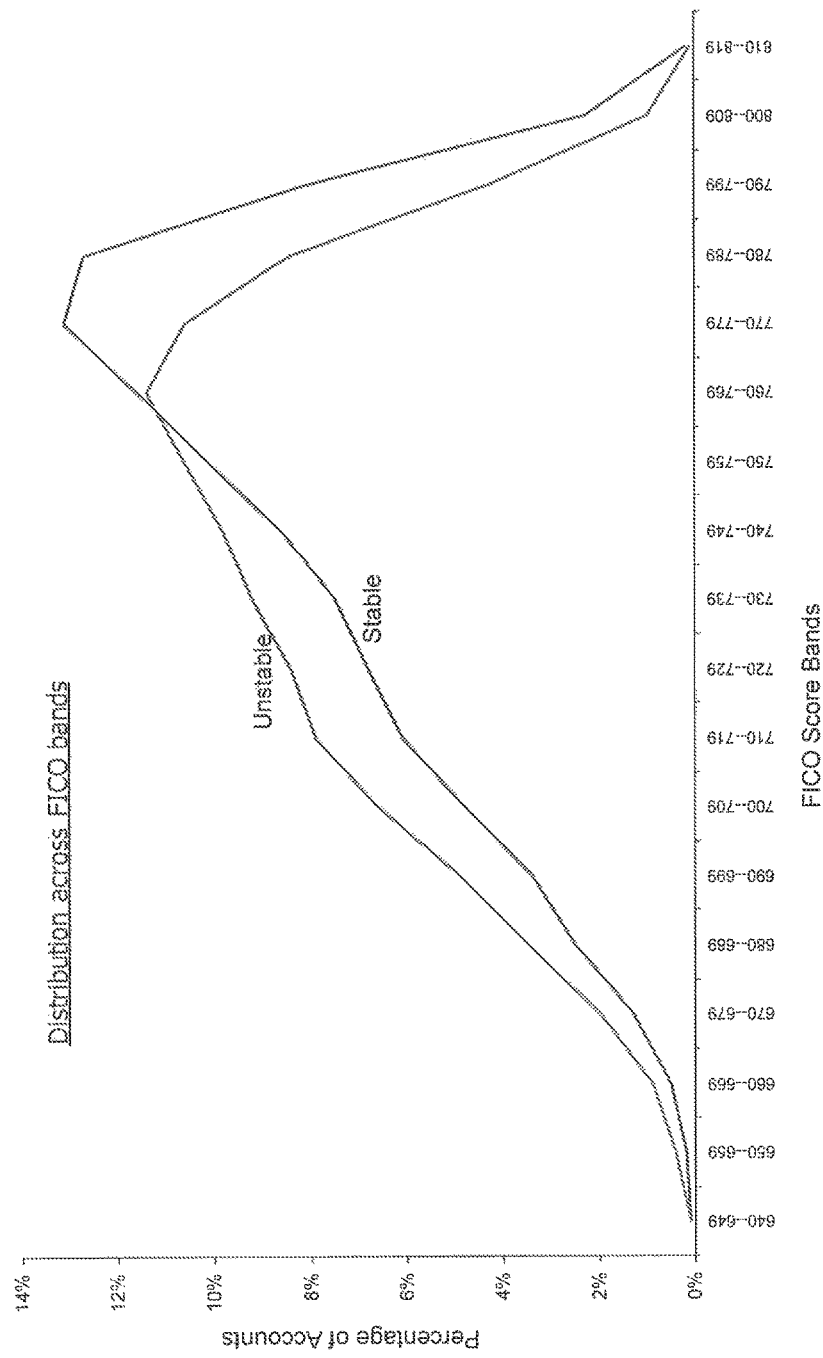
FIG. 7B provides an exemplary graph of the distribution of stable and unstable occupations over FICO bands.

FIG. 7B, however, indicates that the occupational stability creditworthiness determinations may provide additional risk splitting when crossed with FICO scores. In other words, occupational risk does not merely mimic other creditworthiness determinations, but it is able to add significant insight into who among those with similar creditworthiness based on prior art methods are actually more or less creditworthy. FIG. 7B provides an exemplary graph of the distribution of stable occupations (e.g., the top quartile and lowest risk occupations) and unstable occupations (e.g., the bottom quartile and highest risk occupations) over FICO bands. That is, the percentage of accounts associated with customers with stable occupations and the percentage of accounts associated with customers with unstable occupations were each graphed according to FICO score bands. As shown, stable and unstable occupations can be found across all FICO score bands. Even among individuals with the same FICO scores, some will be employed in stable occupations and some will be employed in unstable occupations.

FIG. 7C is an exemplary graph depicting the orthogonal splitting power the stability of occupation has on top of a FICO score in determining creditworthiness. The cumulative Pbad/orig rate for accounts associated with individuals with (1) low FICO scores and stable occupations, (2) low FICO scores and unstable occupations, (3) high FICO scores and stable occupations, and (4) high FICO scores and unstable occupations are shown. Consistent with the data in FIGS. 7A and 7B, FIG. 7C shows the splitting based on stability of incomes above and beyond the splitting due to FICO score differences. Accounts associated with individuals with low FICO scores had higher cumulative Pbad/orig rates than those with high FICO scores, regardless of the individual's occupation (though it is understood that in certain circumstances, occupations may have more influence over cumulative Pbad/origrates than FICO scores). But among those with low FICO scores, those with unstable occupations had more than double the cumulative Pbad/orig rate than those with stable occupations. The same is true for those with high FICO scores: those with high FICO scores but unstable occupations had more than double the cumulative Pbad/orig rate than those with stable occupations.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in hardware alone. Additionally, although disclosed aspects are described as being stored in a memory on a computer, one skilled in the art will appreciate that these aspects can also be stored on other types of computer-readable media, such as secondary storage devices, like hard disks, floppy disks, a CD-ROM, or other forms of RAM or ROM. In addition, an implementation of software for disclosed aspects may use any variety of programming languages, such as Java, C, C++, JavaScript, or any other now known or later created programming language.

Other embodiments will be apparent to those skilled in the art from consideration of the specification and practice of the embodiments disclosed herein. It is intended that the specification and examples be considered as exemplary only, with the true scope and spirit being indicated by the following claims. For example, in some embodiments, the risk band scores and occupational risk scores may be directly related to the level of risk and inversely related to creditworthiness (such as shown in FIG. 4A), such that the lower the score, the lower the risk and the higher the creditworthiness. Conversely, in some embodiments, the risk band scores and occupational risk scores may be inversely related to the level of risk and directly related to creditworthiness, such that the lower the score, the higher the risk and the lower the creditworthiness. It is contemplated that these or other scoring schemes may be employed, and one of skill in the art will be able to modify the disclosure as appropriate and/or necessary to accommodate the scoring scheme used.

The disclosed embodiments may be performed with clients 102 that are mobile devices or tablets through mobile applications that provide communications with the functionalities of financial account provider system 104 as disclosed herein. In other embodiments, financial account provider system 104 may not be associated with any particular financial account provider 110 or any type of account provider, but rather it may be associated with a third party system that is leveraged by account provider(s) determine the creditworthiness of customers 101. For instance, a business may implement the disclosed embodiments such that it offers creditworthiness determining services for other businesses (e.g., financial account provider 110). For example, a business entity may host and provide financial account provider system 104 and its functionalities such that financial account provider system 104 performs creditworthiness determination processes on behalf of one or more account providers. The hosting financial account provider system entity may charge fees for such services, and those fees may be adjusted based on the types of creditworthiness determination services provided, the number of creditworthiness determinations completed, or other fee arrangements. In such embodiments, one or more of the creditworthiness determinations may be performed by financial account provider 110, while others performed by the third party financial account provider system provider. Alternatively, financial account provider system 104 may perform all of the creditworthiness determinations for a customer 101 and report results to a financial account provider 110 through known computer systems and networking components.

In addition, the disclosed embodiments may not be limited to any particular type of account or device. That is, instead of financial accounts, aspects of the disclosed embodiments may be implemented to provide creditworthiness or risk assessments for any type of account (e.g., financial, memberships, utilities, phone services, etc.). Further, the disclosed embodiments may be provided as a one-stop online location for providing creditworthiness determinations for one or more different types of accounts. Further, financial account provider system 104 may provide creditworthiness determinations for businesses instead of individuals, wherein the stability of a particular type of business may be used to determine the credit risk of that business (either used alone or in combination with other known indicators of creditworthiness). One of skill in the art would understand the types of indicators of stability for businesses that would be advantageous. For example, indicator of stability data on the average annual net revenues for a certain type of business may be used (instead of average annual income for individuals), and average failure/bankruptcy rates may be used (instead of unemployment rates).

What is claimed is:

1. A financial account provider system for providing a creditworthiness of an online customer for display, the system comprising:
   a storage device storing instructions; and
   a processor configured to execute the instructions in the storage device to perform the operations of:
      receiving, by a user interface, occupation information from a customer;
      obtaining occupation title data from the received occupation information;
      processing the occupation title data, by:
         formatting the occupation title data by performing at least one of:
            expanding abbreviations contained within the customer occupation title data,
            removing at least one of stop words or special characters from the customer occupation title data, or
            spell-checking the customer occupation title data, and
         creating a set of related occupation title data based on the formatted occupation title data, wherein each related occupation title data from the set is associated with a value of indicator of stability;
      consolidating the set of related occupation title data and the associated indicator of stability to produce a plurality of consolidated customer occupations, each consolidated customer occupation being produced by:
         determining risk bands for the indicators of stability corresponding to the set of related occupation title data based on a distribution of the values of the indicators of stability,
         assigning the determined risk bands to the set of related occupation title data based on the values of the indicators of stability,
         generating occupational risk scores for the set of related occupation title data based on an orthogonal risk splitting of the assigned risk bands, and
         calculating a final occupational risk score based on a weighted average of the generated occupational risk scores such that certain indicators of stability have a greater effect on the final occupational risk score than other indicators of stability;
      associating the occupation information received from the customer with one of the consolidated customer occupations;
      assigning the final occupational risk score of the one of the consolidated customer occupations to the customer;
      calculating a creditworthiness of the customer based on the assigned final occupational risk score; and
      transmitting an online advertisement offering at least one of financial accounts or changes to existing financial accounts related to the creditworthiness to a financial account provider for display on a display screen configured to present to the customer visiting a web page via a web browser-based user interface.

2. The system of claim 1, wherein the indicators of stability comprises at least one of: average annual income for an occupation, average highest educational level attained for the occupation, percentage of persons with different educational histories for the occupation, average unemployment rate for the occupation, or stability of unemployment rate for the occupation.

3. The system of claim 1, wherein assigning the determined risk bands to the set of related occupation title data further comprises assigning at least one risk band value for the determined risk bands, a higher value associated with more risk than a lower value, and wherein calculating the final occupational risk score further comprises summing the assigned risk band values.

4. The system of claim 1, wherein assigning the determined risk bands to the set of related occupation title data further comprises assigning at least one weighted risk band value for the determined risk bands, a higher value associated with more risk than a lower value, and wherein calculating the final occupational risk score further comprises summing the assigned weighted risk band values.

5. The system of claim 1, wherein calculating the creditworthiness of the customer based on the assigned final occupational risk score further comprises combining the assigned final occupational risk score with the customer's FICO score.

6. The system of claim 1, wherein the system is associated with a financial service provider.

7. The system of claim 1, wherein the system is associated with a third party business; and wherein the processor is configured to execute the instructions in the storage device to perform the further operations of providing a result of the creditworthiness calculation to one or more financial service providers.

8. The system of claim 1, wherein the processor is configured to execute the instructions in the storage device to perform operations further comprising:
   retrieving indicators of stability data from one or more public and private occupational databases; and
   formatting the indicators of stability data to create the indicators of stability.

9. The system of claim 1, wherein the processor is configured to execute the instructions in the storage device to perform operations further comprising:
   classifying occupations by grouping occupations with similar occupational risk scores into the same risk class.

10. The system of claim 9, wherein calculating the creditworthiness of the customer based on the assigned final occupational risk score further comprises combining the assigned final occupational risk score with the customer's FICO score.

11. The system of claim 1, wherein the orthogonal risk splitting includes splitting the assigned risk bands between unstable occupations and stable occupations for occupations with high incomes.

12. A computer-implemented method for providing a creditworthiness of an online customer for display, comprising:
   receiving, by a user interface, occupation information from a customer;
   obtaining occupation title data from the received occupation information;
   processing the occupation title data by:
      formatting the occupation title data by performing at least one of:
         expanding abbreviations contained within the customer occupation title data,
         removing at least one of stop words or special characters from the customer occupation title data, or spell-checking the customer occupation title data, and creating a set of related occupation title data based on the formatted occupation title data, wherein each related occupation title data from the set is associated with a value of indicator of stability;

consolidating the set of related occupation title data and the associated indicators of stability to produce a plurality of consolidated customer occupations, each consolidated customer occupation being produced by:

determining risk bands for the indicators of stability corresponding to the set of related occupation title data based on a distribution of the values of the indicators of stability, assigning the determined risk bands to the set of related occupation title data based on the values of the indicators of stability, generating occupational risk scores for the set of related occupation title data based on an orthogonal risk splitting of the assigned risk bands, and calculating a final occupational risk score based on a weighted average of the generated occupational risk scores such that certain indicators of stability have a greater effect on the final occupational risk score than other indicators of stability;

associating the occupation information received from the customer with one of the consolidated customer occupations;

assigning the final occupational risk score of the one of the consolidated customer occupations to the customer;

calculating a creditworthiness of the customer based on the final assigned occupational risk score; and transmitting an online advertisement offering at least one of financial accounts or changes to existing financial accounts related to the creditworthiness to a financial account provider for display on a display screen configured to present to the customer visiting a web page via a web browser-based user interface.

13. The method of claim 12, wherein the indicators of stability comprises at least one of: average annual income for an occupation, average highest educational level attained for the occupation, percentage of persons with different educational histories for the occupation, average unemployment rate for the occupation, or stability of unemployment rate for the occupation.

14. The method of claim 12, wherein assigning the determined risk bands to the set of related occupation title data further comprises assigning at least one risk band value for the determined risk bands, a higher value associated with more risk than a lower value, and wherein calculating the final occupational risk score further comprises summing the assigned risk band values.

15. The method of claim 12, wherein assigning the determined risk bands to the set of related occupation title data further comprises assigning at least one weighted risk band value for the determined risk bands, a higher value associated with more risk than a lower value, and wherein calculating the final occupational risk score further comprises summing the assigned weighted risk band values.

16. The method of claim 12, wherein calculating the creditworthiness of the customer based on the assigned final occupational risk score further comprises combining the assigned final occupational risk score with the customer's FICO score.

17. The method of claim 12, further comprising:
retrieving indicators of stability data from one or more public and private occupational databases; and
formatting the indicators of stability data to create the indicators of stability.

18. The method of claim 12, wherein calculating the creditworthiness of the customer based on the assigned final occupational risk score further comprises combining the assigned final occupational risk score further with the customer's FICO score.

19. The method of claim 12, further comprising:
splitting the assigned risk bands between unstable occupations and stable occupations for occupations with high incomes.

20. A non-transitory computer-readable medium storing instructions which, when executed by a processor, perform operations for providing creditworthiness of an online customer for display, comprising:

receiving, by a user interface, occupation information from a customer;

obtaining occupation title data from the received occupation information;

processing the occupation title data by:
formatting the occupation title data by performing at least one of:
expanding abbreviations contained within the customer occupation title data,
removing at least one of stop words or special characters from the customer occupation title data, or spell-checking the customer occupation title data, and creating a set of related occupation title data based on the formatted occupation title data, wherein each related occupation title data from the set is associated with a value of indicator of stability;

consolidating the set of related occupation title data and the associated indicators of stability to produce a plurality of consolidated customer occupations, each consolidated customer occupation being produced by:

determining risk bands for the indicators of stability corresponding to the set of related occupation title data based on a distribution of the values of the indicators of stability, assigning the determined risk bands to the set of related occupation title data based on the values of the indicators of stability, generating occupational risk scores for the set of related occupation title data based on an orthogonal risk splitting of the assigned risk bands, and calculating a final occupational risk score based on a weighted average of the generated occupational risk scores such that certain indicators of stability have a greater effect on the final occupational risk score than other indicators of stability;

associating the occupation information received from the customer with one of the consolidated customer occupations;

assigning the final occupational risk score of the one of the consolidated customer occupations to the customer;

calculating a creditworthiness of the customer based on the assigned final occupational risk score; and transmitting an online advertisement offering at least one of financial accounts or changes to existing financial accounts related to the creditworthiness to a financial account provider for display on a display screen configured to present to the customer visiting a web page via a web browser-based user interface.

21. The non-transitory computer-readable medium of claim 20, further comprising:

splitting the assigned risk bands between unstable occupations and stable occupations for occupations with high incomes.

\* \* \* \* \*

UNITED STATES PATENT AND TRADEMARK OFFICE
CERTIFICATE OF CORRECTION

| | |
|---|---|
| PATENT NO. | : 10,157,418 B1 |
| APPLICATION NO. | : 14/093647 |
| DATED | : December 18, 2018 |
| INVENTOR(S) | : Krishnan Swamy et al. |

Page 1 of 1

It is certified that error appears in the above-identified patent and that said Letters Patent is hereby corrected as shown below:

On the Title Page

Item (57), Line 1-2, "methods are disclosed for determine creditworthiness" should read -- methods are disclosed for determining creditworthiness --.

Signed and Sealed this
Eighteenth Day of June, 2019

Andrei Iancu
*Director of the United States Patent and Trademark Office*